United States Patent [19]

Durham et al.

[11] Patent Number: 5,732,964
[45] Date of Patent: Mar. 31, 1998

[54] USER-PROPELLED STEERABLE APPARATUS

[75] Inventors: Kimberly Elizabeth Durham, Jackson, Miss.; Edwin Alphonso, Herndon, Va.; Jinqiu Chen, Memphis, Tenn.; Peter Gregory Davis, Ventura, Calif.; John T. R. Dillon, III, Cape Canaveral, Fla.; Dona M. Kambeyanda, Memphis, Tenn.; Yashdeep Kumar, Memphis, Tenn.; Thanigaivel Ashwin Raj, Memphis, Tenn.; Michael James Rosen, Germantown, Tenn.

[73] Assignee: Magic Walker, L.C., Jackson, Miss.

[21] Appl. No.: 429,624

[22] Filed: Apr. 27, 1995

[51] Int. Cl.⁶ ............................ B62M 1/14; A61H 3/04
[52] U.S. Cl. .................. 280/266; 280/87.021; 280/87.05; 482/68; 135/67
[58] Field of Search ................ 280/1.5, 263, 266, 280/267, 269, 87.021, 87.041, 87.05, DIG. 11; 297/5, 6; 482/66, 68, 69; 180/907; 135/66, 67

[56] References Cited

U.S. PATENT DOCUMENTS

| | | | |
|---|---|---|---|
| 689,599 | 12/1901 | Snow | 280/267 |
| 1,241,474 | 9/1917 | Mason | 280/87.021 X |
| 1,697,526 | 9/1929 | Gianera | 280/266 |
| 2,578,828 | 12/1951 | Nelson | 280/266 |
| 3,180,678 | 4/1965 | McCabe | 280/267 |
| 3,208,764 | 9/1965 | Holland . | |
| 3,488,088 | 1/1970 | Goldberg et al. | 482/68 X |
| 3,690,697 | 9/1972 | Bohanski . | |
| 4,364,580 | 12/1982 | Shapcott | 280/266 |
| 4,506,902 | 3/1985 | Maebe | 280/267 X |
| 4,807,870 | 2/1989 | Hickman | 482/68 |
| 4,927,167 | 5/1990 | Davis . | |
| 4,941,670 | 7/1990 | Parr | 280/87.021 |
| 4,968,050 | 11/1990 | Kendrick et al. . | |
| 5,112,072 | 5/1992 | Korosue . | |
| 5,167,597 | 12/1992 | David | 280/267 X |
| 5,172,925 | 12/1992 | Kendrick et al. . | |
| 5,242,180 | 9/1993 | Bergeron . | |
| 5,275,426 | 1/1994 | Tankersley . | |
| 5,340,139 | 8/1994 | Davis . | |
| 5,467,793 | 11/1995 | Hart | 280/87.021 X |

FOREIGN PATENT DOCUMENTS 2 231 500 A  11/1990  United Kingdom .

OTHER PUBLICATIONS

Preston, ABC 1994 Catalog, 1994, pp. 30, 34–35.
Consumer Care Products, Inc., Prone Support Walker, 1989.
Achievement Products, Inc., Achievement Products Catalog, 1993, pp. 19, 20 and 57.
Taylor Made Healthcare, Bugsy Active Mobility Posture Walker, 1993.
Jesana, Ltd., Jesana Catalog, 1991–92, p. 6.
Rifton, Rifton for People with Disabilities, 1993–94, pp. 12–17.
Taylor Made Healthcare, Mobile Stander for Kids, 1993.

*Primary Examiner*—Brian L. Johnson
*Assistant Examiner*—Gary Savitt
*Attorney, Agent, or Firm*—Pravel, Hewitt, Kimball & Krieger

[57] ABSTRACT

A user-propelled walking apparatus comprising a frame assembly having a pair of front wheels and a pair of rear wheels. The pair of front wheels are maintained substantially parallel to one another. An upper body and seat assembly having a seat and a movable torso support unit is mounted to the frame assembly. The movable torso support unit is allowed to rotate or pivot. The rotation or pivoting movement of the movable torso support unit is connected to a mechanical transmission for controlling steering which controls the direction of the front wheels. A gait guide system comprising a pair of independent gait guides attached to the frame assembly to limit the movement of the user's feet. Each of the gait guides includes an elongate rail pivotally connected to the frame assembly. A sleeve is slidably mounted on the elongate rail and a shoe bracket is pivotally connected to the sleeve.

22 Claims, 6 Drawing Sheets

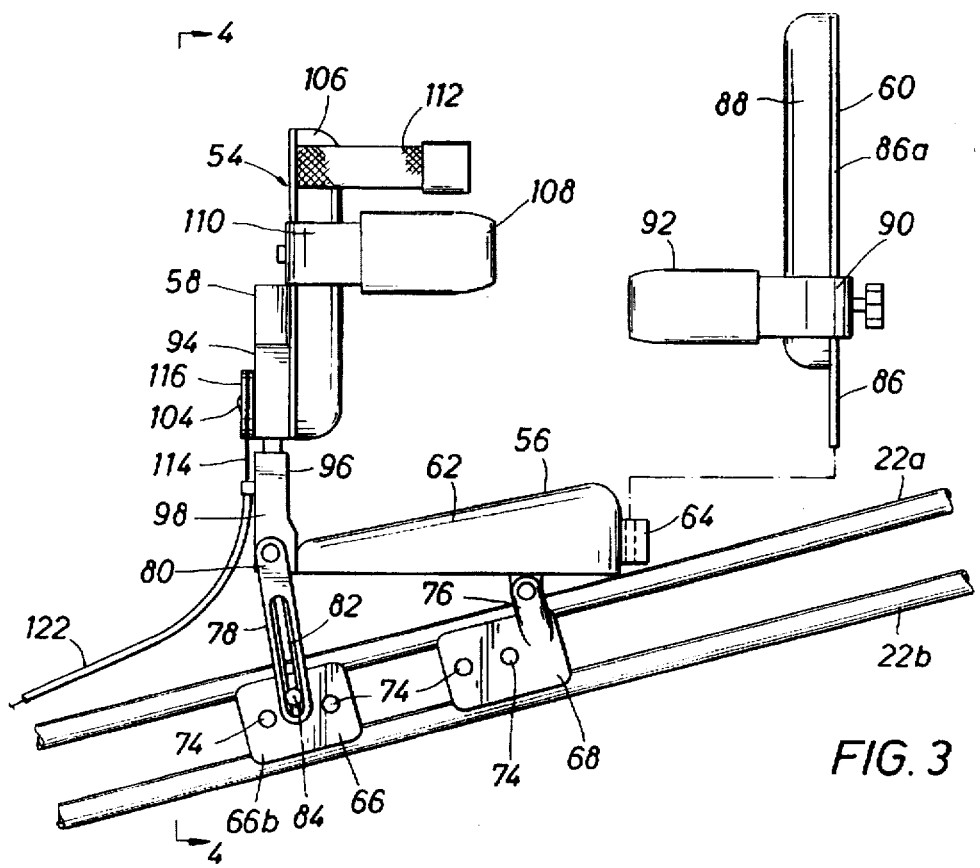
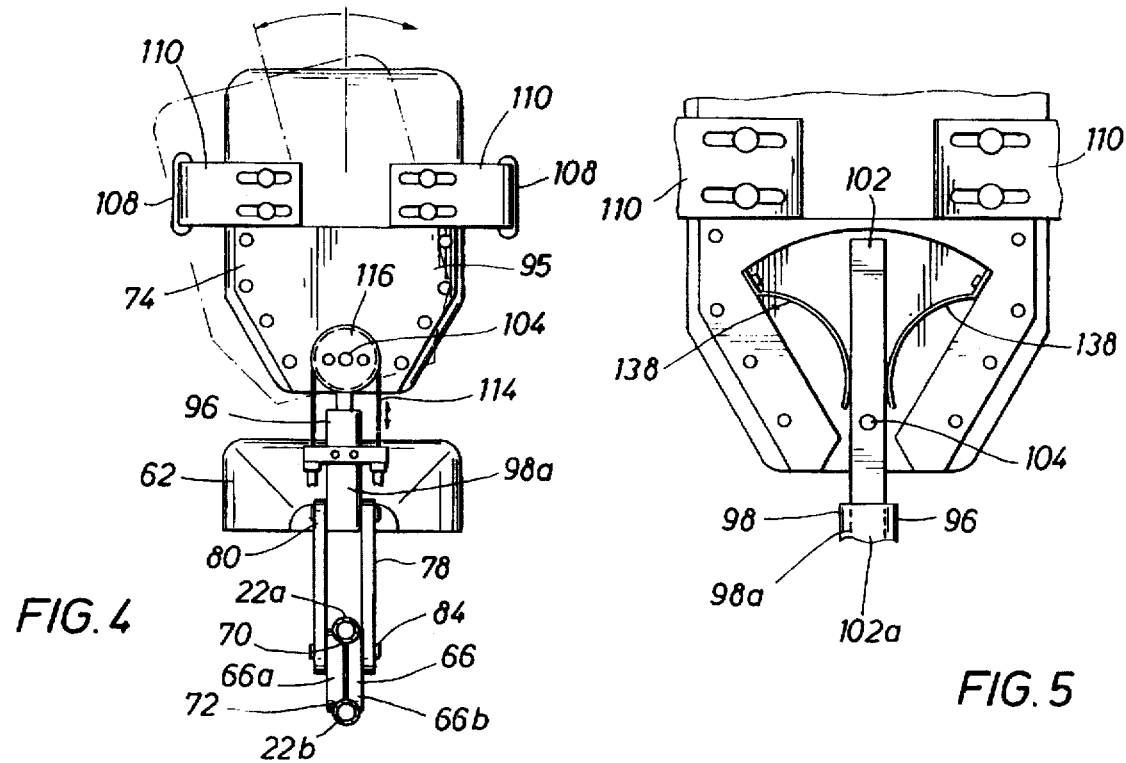
FIG. 3
FIG. 4
FIG. 5

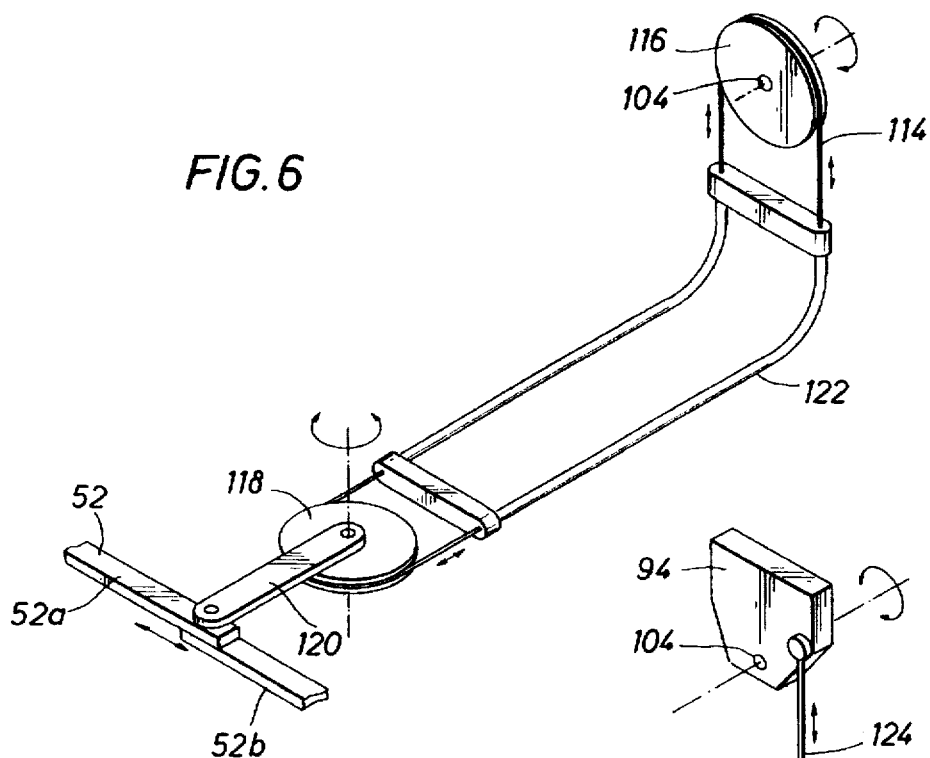
FIG. 6
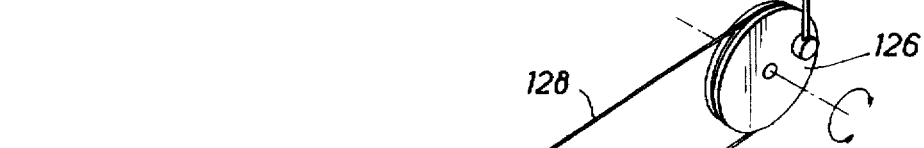
FIG. 7
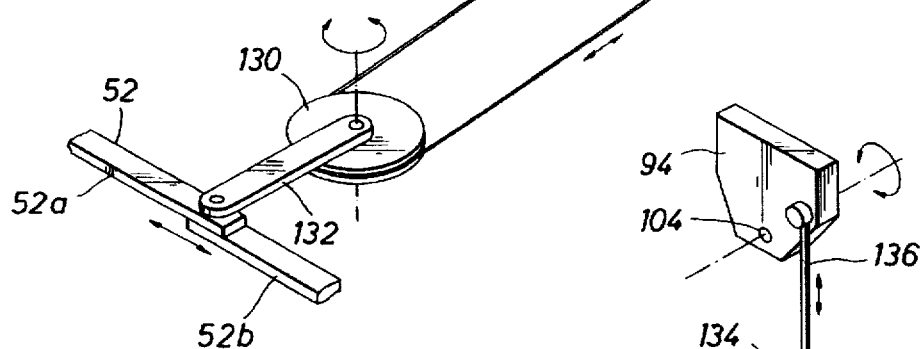
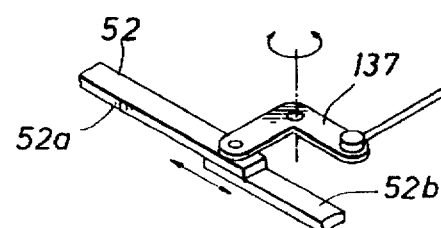
FIG. 8

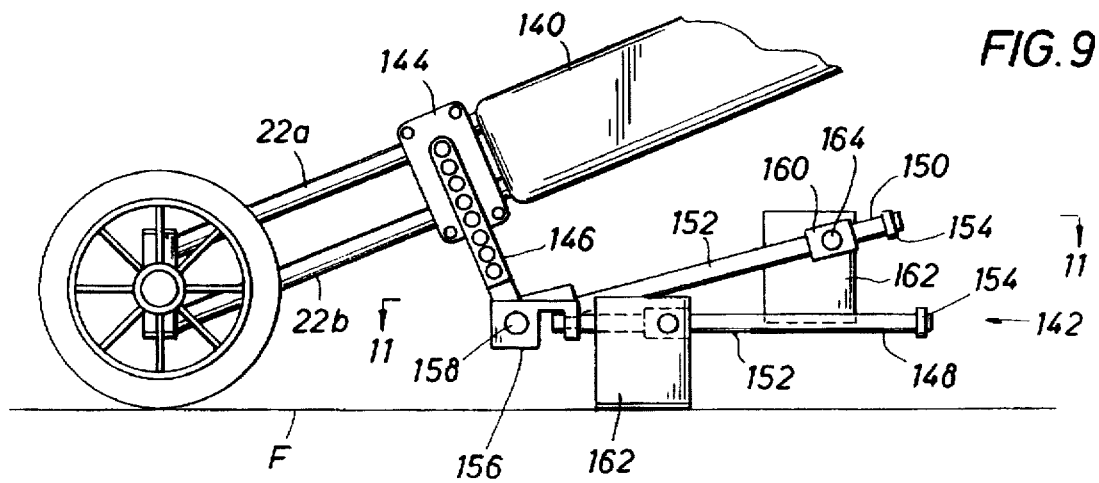

USER-PROPELLED STEERABLE APPARATUS

BACKGROUND OF THE INVENTION

1. Field of the Invention

The present invention relates to mobility devices for physically disabled individuals, and in particular, to mobility walker devices which enable a user to move about on his/her own and under the user's power.

2. Brief Description of the Related Art

One of the most frequent physical disabilities with onset at birth is cerebral palsy. Cerebral palsy refers to motor (movement) and other disorders resulting from damage to the brain. The movement disorder is characterized by inaccurate control of muscles rather than muscle weakness (although the latter can also be present). All children with cerebral palsy are limited, to varying degrees, in their capacity to produce coordinated, effective purposeful movement. During a child's preschool years it is very important to achieve the most effective mode of locomotion (i.e., walking, wheelchairs, or other assistive devices) because the capacity to learn ambulation may diminish by the end of this period and because of the emotional, social, and developmental importance of the child exploring his/her environment.

There are various types of assistive devices on the market today which allow children with motor disabilities to ambulate with some degree of independence. These devices can be divided into several categories which include: walkers, crawlers, hand-propelled scooters, gait trainers, mobile standers, and wheelchairs.

Several walkers are available for children with disabilities. One type of walker includes an upright frame having a pair of handgrips and one or two pairs of wheels. The standing child grips the handgrips, bears weight on them, and walks along with the walker. Another type of walker includes a wheeled frame having a seat and an outer padded ring to provide support when the child gets tired.

Crawler devices include an adjustable height platform mounted on four casters. The platform provides support to the child's torso. The crawler devices are used in a crawling position.

Hand-propelled scooters are sometimes called prewheelchairs and are designed for children with good upper body strength and coordination. The child sits in the device with his/her legs in front of him/her. The device is maneuvered by the child using the child's hands to rotate large wheels located on both sides of the device, similar to a manual wheelchair.

Gait trainers are assistive devices which allow the child to experience independent movements involved in walking. The devices provide the child with the support needed in order to maintain correct balance and posture for walking. Typically, the device includes a wheeled frame having a trunk support, a pelvic prompt, and sliding leg prompts. U.S. Pat. No. 5,275,426 to Tankersley discloses one such device having a wheeled frame and a torso encircling and supporting jacket.

Mobile standers place the child in an upright position. The mobile stander includes a full front body support and a strapping system available for children unable to bear their full weight. Examples of mobile standers are disclosed in U.S. Pat. Nos. 4,927,167, 4,968,050, 5,172,925, 5,242,180, and 5,340,139.

U.S. Pat. No. 4,968,050 to Kendrick et al. and U.S. Pat. No. 4,927,167 to Davis disclose ambulatory wheelstands having a pair of large drive wheels and a pair of caster wheels. The user is supported by an inclinable user support structure having a lower foot support. The user is able to move by manually rotating the pair of large drive wheels.

U.S. Pat. No. 5,340,139 to Davis discloses a wheelstand-walker as an second embodiment. The wheelstand-walker converts from an ambulatory wheelstand. The wheelstand-walker includes a chest pad, a pair of adjustable knee pads and a posterior pelvic stabilizer, or an elongated, curved saddle pivotably attached to a "goose neck" bar. A pair of optional thoracic lateral pads extend from the sides of the chest pad to stabilize the trunk laterally and to support the trunk in the midline position. Also optionally provided is a posterior thoracic panel for attachment to the lateral pads by a strap and an anterior abdominal pad.

All of the assistive mobility devices listed above are beneficial to children with disabilities because they cause psychosocial and emotional improvement due to independent mobility. Despite their value, these assistive mobility devices have important limitations. Many of the devices are too large to be practical for environments such as the home and classroom. Some of these devices prevent the child from manipulating objects in the child's environment due to the size and cage-like character of their frames. Crawlers and walkers do not provide children with more severe disabilities with a means to steer. Hand-propelled scooters and wheelchairs do not provide weight-bearing for the legs which is needed for the growth of bones. Some of the devices are not adjustable, and thus, as the child grows the device must be replaced.

Cerebral palsy is classified according to the area of the body affected and the symptom complex exhibited. Spasticity, for example, is a state of hypertonicity in which there is an increase over the normal tone (i.e., the "dc" contractile activity and/or reflex response to stretch of a muscle). Athetosis is defined as writhing-like involuntary abnormal movements which occur when purposeful motion is attempted. It is desirable to have a mobility device which is suitable for a child having cerebral palsy and exhibiting the symptoms of spasticity and athetosis.

As indicated above, the motor development of children with cerebral palsy is not only delayed, but also impaired. Although some children with cerebral palsy eventually learn to walk with the help of intensive therapy, they may lose several developmentally important years during which able-bodied toddlers and pre-toddlers explore their environments independently by creeping, crawling, or walking.

Children with cerebral palsy are also limited in their ability to produce purposeful movements required for walking because of their decreased muscle mass, altered energy need, and reduced anaerobic power. Many children with spastic cerebral palsy have quantitative restrictions in the form of reduced muscle mass. An important stimulus for normal muscle growth is stretch. When external stretch is applied to a spastic muscle it is opposed by an abnormally strong stretch reflex response, and therefore, is maintained in a shortened position resulting in diminished growth and reduced muscle mass. As a result, children with spastic cerebral palsy may not be able to generate much muscle power or endure effort for a long time. Consequently, children with cerebral palsy frequently complain of fatigue while walking.

Children with cerebral palsy commonly have altered energy needs because their body components and motor activity differ widely from the norm. Most children with cerebral palsy have an increase in energy expenditure proportional to the severity of the disability. Since normal muscle function is lost in some parts of the body, the remaining muscles must work harder to compensate. Loss of balance, poor motor control, and decreased range of motion contribute to the increase in the vertical displacement of the center of gravity during gait, and therefore to an increase in energy expenditure.

Additionally, studies have shown that peak and mean anaerobic muscle power of the upper and lower limbs in children with spastic cerebral palsy are subnormal. Several physiologic mechanisms contribute to the decrease in the child's power. These include an increase in slow-twitch fibers in muscles, a decrease in muscle growth, and muscle atrophy.

There has been a heightened awareness of the importance of physical fitness for people with disabilities in recent years. Enhanced activity of children with disabilities offers psychological and social gains including mood-state improvement, a reduction in anxiety and depression, increase in self-esteem, new friendships and new experiences.

One way physical fitness of many children with cerebral palsy could be improved is by enabling them to walk independently using an assistive device. Walking, like any form of exercise, enhances physical fitness by increasing muscle strength, cardiovascular endurance, and contributes to emotional and psychological well-being. Walking also encourages the child to independently explore, observe, and manipulate his/her environment.

It is desirable to have a user-propelled walking apparatus which promotes weight-bearing, increases physical fitness, utilizes the child's strength and power output, provides adequate steering, encourages independent mobility, and meets the size constraints of the indoor environment. It is also desirable that the mobility device be safe, sturdy, adaptable and aesthetically appealing.

SUMMARY OF THE INVENTION

The user-propelled walking apparatus according to the present invention is designed for children having physical disabilities, specifically cerebral palsy.

The user-propelled walking apparatus includes a frame assembly having a pair of front wheels and a pair of rear wheels. The frame assembly has a centrally located pair of longitudinal frame members which the child straddles during use of the apparatus. The pair of rear wheels are rotatably mounted to the rear of the frame assembly. The pair of front wheels are rotatably mounted to the front of the frame assembly. A seat support system is connected to the longitudinal frame members. The seat support system includes a seat assembly, a front support assembly, and a rear support assembly to provide support and stabilize the child's pelvis and upper body on the user-propelled walking apparatus. The angle of inclination of the seat support system and the seat height are adjustable to allow placement at the height and angle at which the child functions best.

A mechanical transmission for controlling steering is provided to allow the child to control the direction of the user-propelled walking apparatus by the child's upper body movements. A movable torso support unit of the seat support system is connected to the pair of front wheels so that the user can control the direction of the pair of front wheels by the manipulation of the movable torso support unit. The user-propelled walking apparatus is very sturdy and has a very low center of gravity.

An optional gait guide system attaches to the longitudinal frame in front of the seat support system. The child's feet fit into shoes attached to carriages on two linear rails each of which is free to pivot about a horizontal axis at the front. The gait guide system limits each of the child's legs while walking to movement in a vertical anterior-posterior plane. The gait guide system prevents scissoring, i.e., the crossing of the legs through the mid-sagital plane while walking. When scissoring is prevented, a more normal looking gait is produced and more strength is directed toward propulsion.

The user-propelled walking apparatus utilizes the child's own power to produce directed movement at a practical and appealing speed. By enabling transmission of the child's power to the ground, the child's limited muscle strength is converted into purposeful motion allowing independent exploration. By restricting the degrees of freedom of the lower extremities and providing sufficient support, the child is enabled to produce the required force to propel the child and the user-propelled walking apparatus forward. The front support of the seat support system is slightly prone to allow purposeful extension of the legs to be directed rearward to produce forward propulsion. The front support used in the seat support system does permit full use of the arms.

The advantages of the mobility device of the subject invention are that it promotes weight-bearing, increases physical fitness, utilizes the child's strength and power output, provides adequate steering independent of propulsion, encourages independent mobility, and meets the size constraints of the indoor environment.

BRIEF DESCRIPTION OF THE DRAWINGS

A better understanding of the invention can be had when the following detailed description of the preferred embodiments are considered in conjunction with the following drawings, in which:

FIG. 3 is a partial side elevational view of the first embodiment of the user-propelled walking apparatus showing the seat and upper body assembly;

FIG. 4 is a view taken along line 4—4 of FIG. 3, the dashed lines showing the movable torso support unit in a tilted position;

FIG. 5 is a view of the movable torso support unit with a cover plate removed;

FIG. 6 is a diagram of a mechanical transmission for controlling steering using a sheathed closed-loop cable assembly;

FIG. 7 is a diagram of a mechanical transmission for controlling steering using a push rod and twisted closed-loop cable assembly;

FIG. 8 is a diagram of a mechanical transmission for controlling steering using a push rod and bellcrank assembly;

FIG. 9 is partial side elevational view of the first embodiment of the user-propelled walking apparatus showing the gait guide assembly;

FIG. 10 is a view similar to FIG. 9 showing a pair of shoes with rollers mounted to the gait guide assembly;

FIG. 11 is a view taken along line 11—11 of FIG. 9;

FIG. 12 is a view taken along line 12—12 of FIG. 10;

DESCRIPTION OF THE PREFERRED EMBODIMENTS

The user-propelled walking apparatus according to a first embodiment of the present invention is generally designated as 100 and the user-propelled walking apparatus according to a second embodiment of the present invention is generally designated as 100'.

Figure 1:
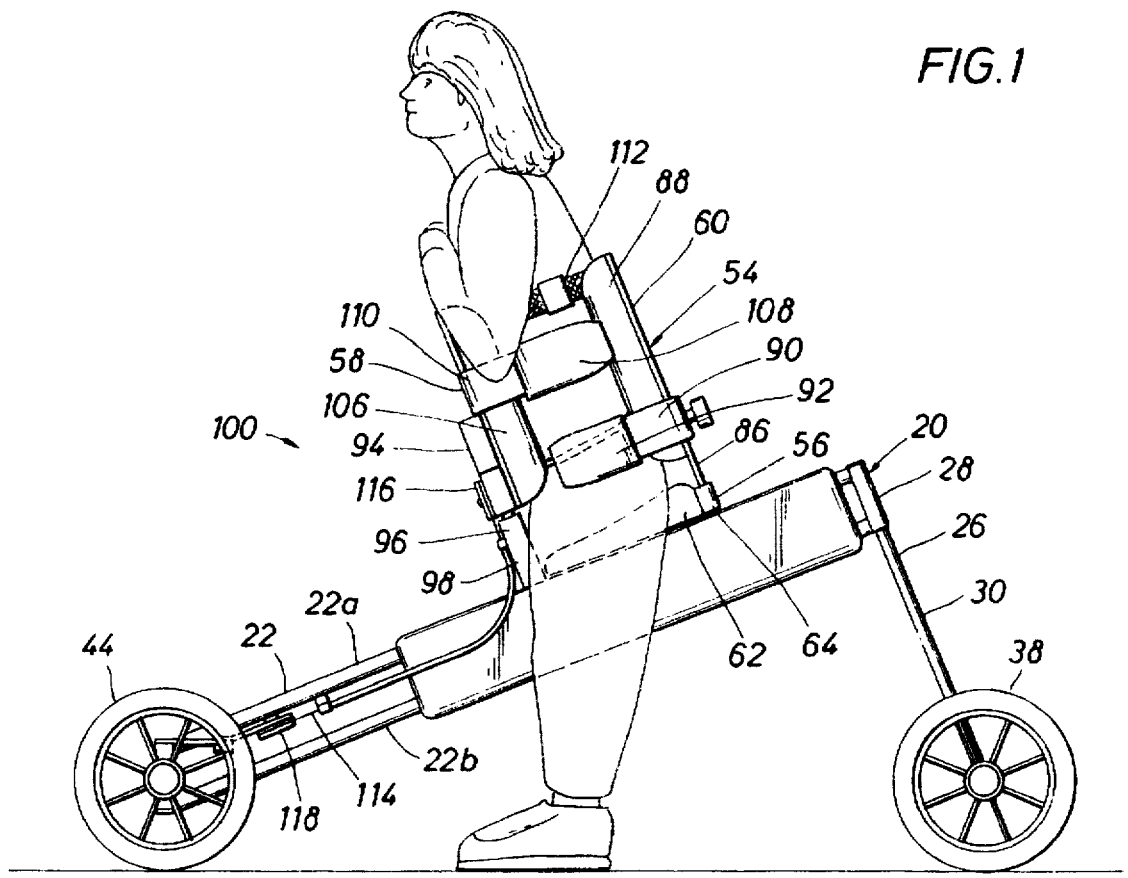
FIG. 1 is a side elevational view of a first embodiment of the user-propelled walking apparatus.
Figure 2:
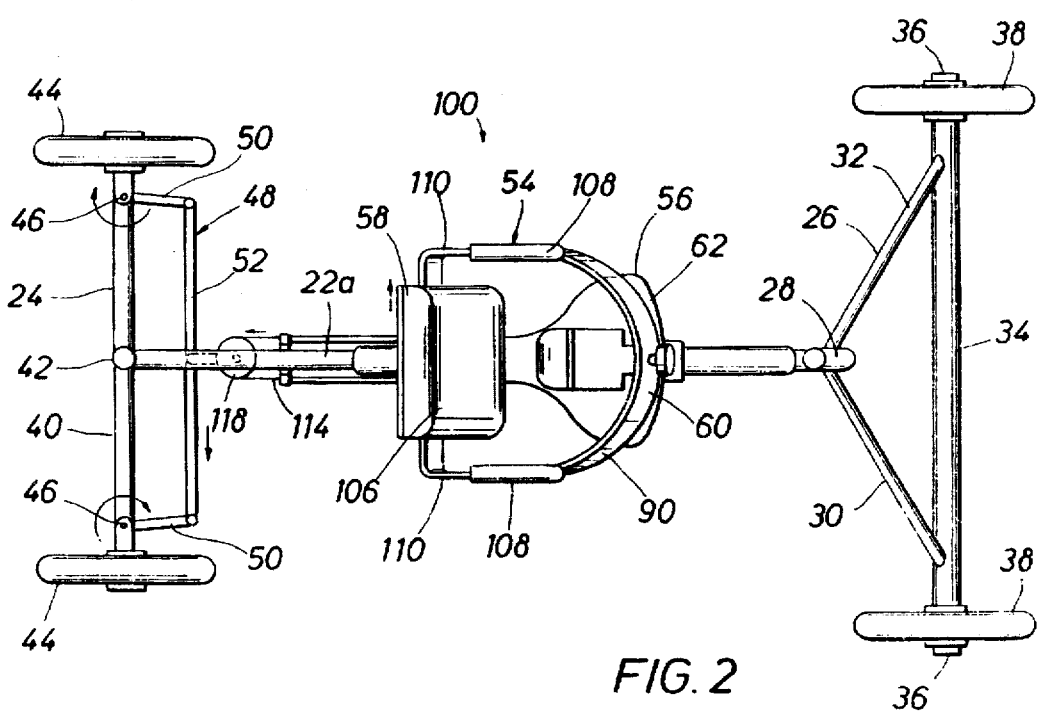
FIG. 2 is a top view of the first embodiment of the user-propelled walking apparatus.

Referring to FIGS. 1 and 2, the user-propelled walking apparatus 100 includes a frame assembly 20 preferably made of lightweight round tubing, as for example tubing used in wheelchairs or bicycle frames. The frame assembly 20 comprises a pair of longitudinal frame members 22 which are connected to a front frame 24 and a back frame 26. The pair of longitudinal frame members 22 collectively comprises an upper longitudinal frame member 22a and a lower longitudinal frame member 22b which are parallel to one another.

Preferably, the back frame 26 has a triangular shape to provide stability to the user-propelled walking apparatus 100. The back frame 26 is connected to the pair of longitudinal frame members 22 at a rear junction post 28 of the back frame 26. Referring to FIG. 2, the back frame 26 includes two upright angled members 30 and 32 and a horizontal back member 34. The horizontal back member 34 includes axle blocks 36 for rotatably mounting a pair of rear wheels-38. Rotation of the rear wheels 38 is independent of each other. Preferably, the axle blocks 36 include extensions (not shown) extending into the horizontal back member 34 which allow the rear wheels 38 to be selectively moved to a more outward track for use in the outdoor environment. Alternatively, the horizontal back member 34 can include a bore (not shown) therethrough which receives a rear axle (not shown) to which to mount the pair of independently rotating rear wheels 38.

The front frame 24 includes a horizontal front member 40 which is parallel with the horizontal back member 34. The front frame 24 includes a front junction post 42 which is connected to the pair of longitudinal frame members 22.

A pair of rotatable front wheels 44 are pivotally connected to each end of the horizontal front member 40. Referring to FIG. 2, the front wheels 44 pivot about a vertical axis at a pivot pin 46. A steering tie rod assembly 48 is connected to the pair of front wheels 44 to maintain the front wheels 44 in substantially the same direction. The steering tie rod assembly 48 includes a pair of steering arms 50 attached to the front wheels 44 at the pivot connection. A pair of lateral tie rods 52, individually referred to as 52a and 52b (FIGS. 6–8), pivotally connects the pair of steering arms 50 and maintains the front wheels 44 in substantially the same direction.

It is to be appreciated that the four-wheeled user-propelled walking apparatus 100 provides added stability while turning which is not present in a three-wheeled device.

Referring to FIGS. 1–4, the user-propelled walking apparatus 100 includes a seat support system 54 having a seat assembly 56, a front support assembly 58, and a rear support assembly 60.

Referring to FIG. 3, the seat assembly 56 includes a padded bicycle-style seat 62 which is adjustably mounted to the pair of longitudinal frame members 22. The seat assembly 56 includes a rear slotted member 64 for receiving the rear support assembly 60 as will be explained below. As shown in FIG. 3, a front seat bracket 66 and a rear seat bracket 68 maintain the seat 62 at the desired height and at the desired angle of inclination. The front and rear seat brackets 66 and 68, respectively, have an upper arcuate groove 70 (FIG. 4) and a lower arcuate groove 72 which grippingly engage the upper and lower longitudinal frame members 22a and 22b, respectively. The front seat bracket 66 includes a pair of mating front sections 66a and 66b which are joined with threaded fasteners 74. The rear seat bracket 68 also includes a pair of mating rear sections (not shown) which are joined with threaded fasteners 74. The rear seat bracket 68 includes a seat post 76. The seat 62 is pivotally attached to the seat post 76.

Still referring to FIG. 3, the front seat bracket 66 includes a support member 78 which attaches at its upper end 80 to the seat 62 and has a lower elongated slot 82 through which a pair of threaded fasteners 84 extend and securely fasten the support member 78 to the pair of mating front sections 66a and 66b. Alternatively, the elongated slot 82 could be replaced with a plurality of holes (not shown) through which the threaded fasteners 84 could extend.

It is to be understood that the height of the seat 62 is adjustable by sliding the front and rear seat brackets 66 and 68, respectively, forward and backward along the pair of longitudinal frame members 22. The angle of the seat 62 can be adjusted by loosening the threaded fasteners 84 extending through the elongated slot 82 and loosening the pivot connections at the upper end 80 of the support member 78 and the seat post 76 and then positioning the seat 62 at the desired angle. Referring to FIGS. 1 and 3, the seat 62 is permitted to rotate at the pivot connection with the seat post 76 from a substantially horizontal position (FIG. 3) to a downward angle of approximately 30°–35° (FIG. 1) relative to horizontal. Once the seat 62 is positioned at the desired angle, the threaded fasteners 84 are tightly secured to the pair of mating front sections 66a and 66b and the seat pivot connections are tightened. The adjustability of the seat height is beneficial because it allows the height of the seat 62 to be increased as the child grows in height. The adjustability of the seat angle is beneficial because it allows the seat 62 to be adjusted and placed at the angle at which the child functions best.

Referring to FIGS. 1–3, the rear support assembly 60 includes an attachment member 86 which is received in the rear slotted member 64 of the seat assembly 56. The attachment member 86 includes an upper portion 86a having a narrow padded bolster 88 attached thereto. Preferably, a U-shaped band 90 is removably mounted to the attachment member 86 and extends forwardly and to the sides of the attachment member 86. A pair of padded rear lateral pads 92 are secured to the U-shaped band 90. In the first embodiment, the U-shaped band 90 is pivotally mounted to allow limited rotational movement as the child moves.

As shown in FIG. 3, the rear support assembly 60 is removable so that the child can be easily placed in and removed from the user-propelled walking apparatus 100. In use, the rear support assembly 60 limits the rearward travel of the child's upper body, but does not hinder motion related to steering or use of the arms.

Referring to FIGS. 1–4, the front support assembly 58 of the user-propelled walking apparatus 100 includes a movable torso support unit 94 which is mounted to the frame assembly 20 via a mounting post assembly 96. Referring to FIGS. 3–5, the mounting post assembly 96 includes a lower mounting post 98 which is secured to the front seat support member 78. As shown in FIG. 5 with a cover plate 95 (FIG. 4) of the movable torso support unit 94 removed for clarity, an upper portion of the lower mounting post 98 includes a bore 98a for receiving an extension 102a of an upper mounting post 102. In the user-propelled walking apparatus 100 of the first embodiment, the upper mounting post 102 is restrained against rotation and axial translation and is maintained in alignment with the lower mounting post 98. The movable torso support unit 94 is generally triangular-shaped and is pivotally connected to the upper mounting post 102 with a pivot pin 104. The movable torso support unit 94 is permitted to rotate through an angle of approximately 30° to either side of the upper mounting post 102 as shown in the dashed lines in FIG. 4.

In the user-propelled walking apparatus 100, the pivot pin 104 of the movable torso support unit 94 is placed as close to the effective axis of lateral torso tilt as possible. This prevents scrubbing or friction between the torso and the chest pad 106 that would occur if the pivot was placed elsewhere. Likewise, the U-shaped band 90, pivotally connected to the rear support assembly 60, also has a pivot located at the child's effective axis of lateral torso tilt.

The front support assembly 58 also includes a padded chest pad 106 mounted to the movable torso support unit 94. A pair of front lateral pads 108 extend rearwardly and to the sides of the chest pad 106 to provide lateral support for the child using the user-propelled walking apparatus 100. As shown in FIGS. 1–5, the pair of front lateral pads 108 are mounted on adjustable L-brackets 110 which are threadably fastened to the movable torso support unit 94.

The front support assembly 58 can be slightly prone to allow purposeful extension of the legs to produce forward propulsion. A seat 62 that is tipped forward without a front support would require additional support via the hands and arms which could limit their use for activities other than maintenance of stability. The front support assembly 58 provides support to enable the child to have full use of his/her arms for voluntary activities.

In the first embodiment, the front support assembly 58 and the rear support assembly 60 are maintained at a 90° angle relative to the seat 62. Thus, as the angle of the seat 62 is changed, the front support assembly 58 and the rear support assembly 60 also change their angle identically.

Referring to FIGS. 1 and 3, additional body support is provided by an upper strap 112 attached to the movable torso support unit 94 for placement around the torso region.

In the first embodiment, the steering of the user-propelled walking apparatus 100 is controlled by the pivoting or tilting laterally of the movable torso support unit 94 about the pivot pin 104 which is typically aligned approximately in the area between the user's navel and the bottom of his/her sternum. The mechanical transmission for controlling steering required to change the direction of the front wheels 44 by the pivotal movement of the movable torso support unit 94 may be accomplished in a variety of ways. FIGS. 6–8 illustrate a few of the various ways to provide the mechanical transmission for controlling steering desired.

Referring to FIGS. 1–4 and 6, the mechanical transmission for controlling steering is provided with a sheathed closed-loop cable 114 which is wrapped around a first pulley 116 located at the pivot pin 104 of the movable torso support unit 94 and a second pulley 118 which is mounted to one of the longitudinal frame members 22a or 22b located substantially adjacent the joined ends of the lateral tie rods 52a and 52b. The cable 114 is in non-slipping engagement with the pulleys 116 and 118. Rotation of the first pulley 116 caused by the movable torso support unit 94 pivoting results in rotation of the second pulley 118. A linkage member 120 connects the second pulley 118 to the lateral tie rods 52a and 52b. Rotation of the second pulley 118 rotates the linkage member 120 which causes the lateral tie rods 52a and 52b to alter the direction of the pair of front wheels 44. The cable 114 is substantially enclosed in sheaths 122 and mounted along the frame assembly 20 in locations meant to avoid interference with the user's legs. Preferably, the sheathed cable 114 is like those used on bicycles to actuate brakes.

As the movable torso support unit 94 tilts to the right when sitting on the apparatus 100 as shown in dashed lines in FIG. 4, the first pulley 116 rotates to the right which results in counterclockwise rotation of the second pulley 118. The linkage member 120 rotates to the left causing the lateral tie rods 52a and 52b to move to the left and the front wheels 44 to turn to the right. Thus, tilting the movable torso support unit 94 to the right results in the front wheels 44 being turned to the right.

Referring to FIG. 7, an alternate mechanical transmission for controlling steering is shown comprising a push rod 124 interconnecting the movable torso support unit 94 with a first pulley 126 which rotates about a lateral axis. Although not shown, the push rod 124 terminates in spherical bearings to accommodate changing angles. A closed-loop cable 128 extends around the first pulley 126 to a second pulley 130 which rotates about a vertical axis. As the movable torso support unit 94 pivots, the push rod 124 causes the first pulley 126 to rotate. The non-slipping cable 128, in turn, causes rotation of the second pulley 130. A linkage member 132 connects the second pulley 130 to the lateral tie rods 52a and 52b. Rotation of the second pulley 130 rotates the linkage member 132 which causes the lateral tie rods 52a and 52b to alter the direction of the pair of front wheels 44.

Referring to FIG. 8, a push rod and bellcrank alternate mechanical transmission for controlling steering is shown. A first bellcrank 134 is pivotally connected to the frame assembly (not shown) at a location substantially below the movable torso support unit 94. The first bellcrank 134 is allowed to rotate about the lateral axis of the user-propelled walking apparatus 100. A first push rod 136 is connected between the movable torso support unit 94 and the first bellcrank 134. A second bellcrank 137 is pivotally connected to the frame assembly (not shown) at a location substantially adjacent the joined ends of the lateral tie rods 52a and 52b. The second bellcrank 137 is allowed to rotate about the vertical axis of the user-propelled walking apparatus 100. A second push rod 138 extends from the first bellcrank 134 to the second bellcrank 137. The lateral tie rods 52a and 52b are connected to the second bellcrank 137.

Referring to FIG. 5, it may be desirable to include a pair of springs 138 within the movable torso support unit 94 to provide elastic resistance to tilting forces exerted by the child. This reduces the tendency of the child's uncontrolled movements to steer the user-propelled walking apparatus 100 off the desired path. The springs 138 also tend to return the user's torso to an upright posture and the user-propelled walking apparatus to a straight direction once a purposeful turn is complete.

An alternative approach to controlling steering which may be appropriate for some users is the use of sensors to transduce controllable actions of the user's upper body, and application of the sensor signals to control a motor which operates the steering mechanism. This "fly-by-wire" power steering approach could incorporate any appropriate electronic amplification and processing of the transducer signals.

A battery to power the motor and any electronics can be mounted in any convenient location on the frame.

Figure 15:
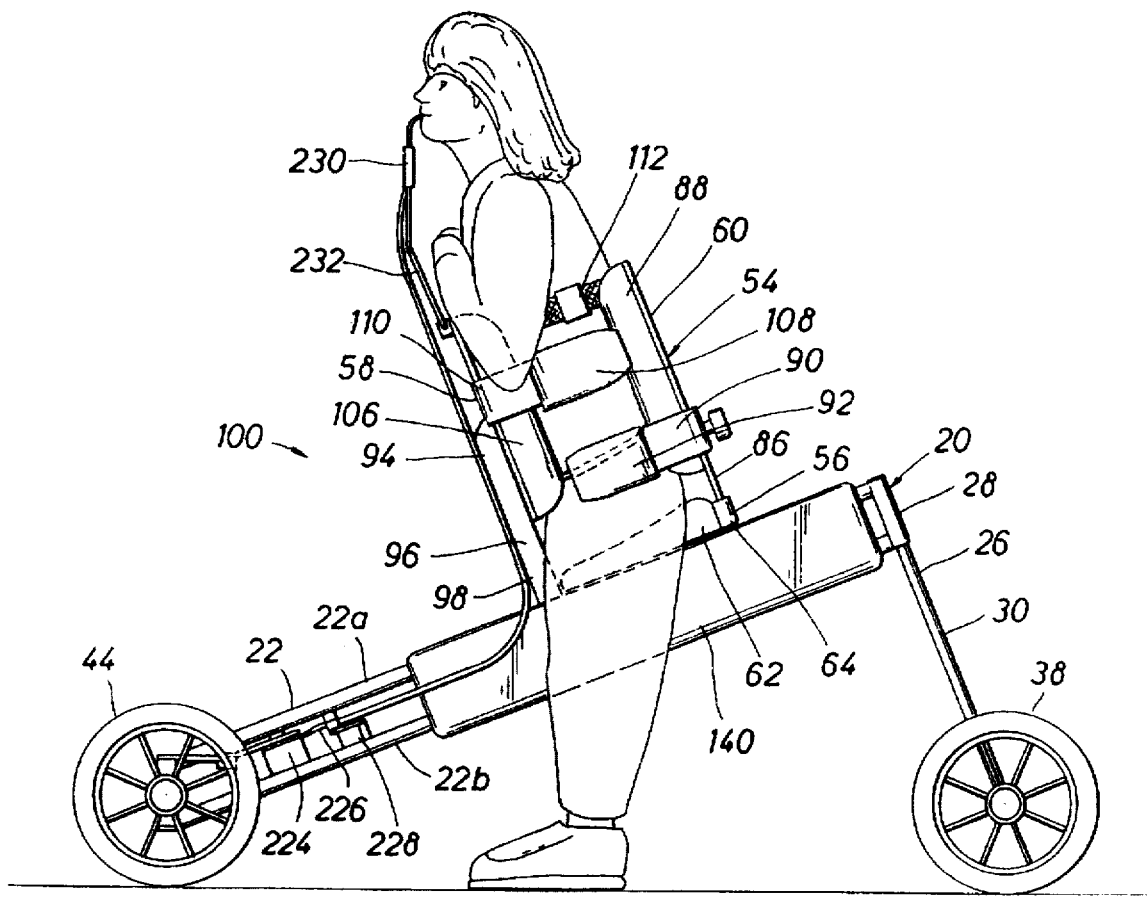
FIG. 15 is a side elevational view of the first embodiment of the user-propelled walking apparatus with the substitution of motor-powered steering controlled by the user through a breath pressure sensor.

Referring to FIG. 15, a wire 226 connects a breath pressure sensor 230 to motor 224 and battery 228. The user applies positive or negative breath pressure to a tube positioned near his/her mouth to command left or right steering. This is one example of many alternative transducers which could be used with motor-powered steering to provide control input. An adjustable support bracket 232 positions the sensor at an appropriate location. Reference numbers used in FIG. 1 are used again here to identify like parts.

Referring to FIGS. 1 and 2, a pair of side frame pads 140 are attached to the pair of longitudinal frame members 22 to provide protection for the child's legs as they come into contact therewith. Preferably, a high memory (visco-elastic) foam is used for padding regions that the child's limbs may impact.

To provide stability, the center of gravity of the user-propelled walking apparatus 100 is centered and kept close to the ground. Typically, the front and rear wheels 44 and 38, respectively, are the same diameter and are approximately 4–6" in diameter. The angle of the pair of longitudinal frame members 22 relative to horizontal is somewhat dependent on the size of the child. For smaller children (2–4 years old) the angle is approximately 20°; for medium size children (4–6 years old) the angle is approximately 25°; and for larger children (6–8 years old) the angle is approximately 30°. The length of the user-propelled walking apparatus 100 from the center of the front wheel 44 to the center of the rear wheel 38 is approximately in the range of 36–40". The length of the horizontal frame member 40 is approximately in the range of 18", whereas the length of the horizontal back member 34 is approximately in the range of 21". Thus, it is very evident that the user-propelled walking apparatus 100 is extremely stable.

Referring to FIGS. 9–12, an optional gait guide system 142 is shown. The gait guide system 142 includes an independent assembly for the left and right legs of the child. Referring to FIGS. 9 and 10, an attachment bracket 144 attaches to the pair of longitudinal frame members 22 proximal the front frame 24 and in front of the pair of side frame pads 140. Placement of the gait guide system 142 along the pair of longitudinal frame members 22 is adjustable and should be positioned relative to the seat. The attachment bracket 144 includes an adjustable fork 146 for attaching the left and right gait guides 148 and 150, respectively. Each gait guide 148, 150 includes an elongate rail 152 having a stop member 154 at one end and a pivot block 156 at the distal end of the elongate rail 152. The pivot block 156 is pivotally connected to an end of the adjustable fork 146 with a pin 158. A sliding sleeve or ball bushing 160 is slidably mounted on the elongate rail 152. The sleeve 160 is free to travel along the length of the elongate rail 152 but is prevented from rotational movement relative to the elongate rail 152 by engagement with grooves in the rail 152. A substantially L-shaped shoe bracket 162 is pivotally connected to the sleeve 160 with a pin 164. A pair of the child's shoes 166 is mounted to the shoe brackets 162 by inserting screws 168 through the shoe brackets and into the heels of the shoes 166 as shown in FIG. 10.

Referring to FIGS. 10 and 12, a plurality of rollers 170 are rotatably mounted to a roller framework 172 which is secured to the sole of the shoe 166. Preferably, the roller framework 172 is positioned in the area below the toes to the instep as shown in FIG. 10. The rollers 170 have a longitudinal axis which parallels the pair of longitudinal frame members 22. To produce forward motion of the user-propelled walking apparatus 100, the rollers 170 frictionally engage the floor F and provide traction for the forward propulsion of the user-propelled walking apparatus 100. Turning motion of the user-propelled walking apparatus 100 is accommodated without loss of traction since the rollers 170 are allowed to roll in the lateral direction.

The gait guide system 142 kinematically constrains the child's legs to purposeful movement to enable the child to produce a more effective and asymmetrically appealing gait. The gait guide system 142 limits each of the child's legs while walking to two degrees of freedom (fore and aft direction and up and down direction). The shoe brackets 162 allow pivotal rotation at the ankle of the child to thus allow the foot to flex about the ankle, and to help the sole to remain in contact with the floor while the lower leg changes its angle.

The gait guide system 142 prevents scissoring, i.e., the crossing of the legs through the mid-sagital plane while walking. When scissoring is prevented, a more normal looking gait is produced and more strength is directed toward propulsion.

Figure 13:
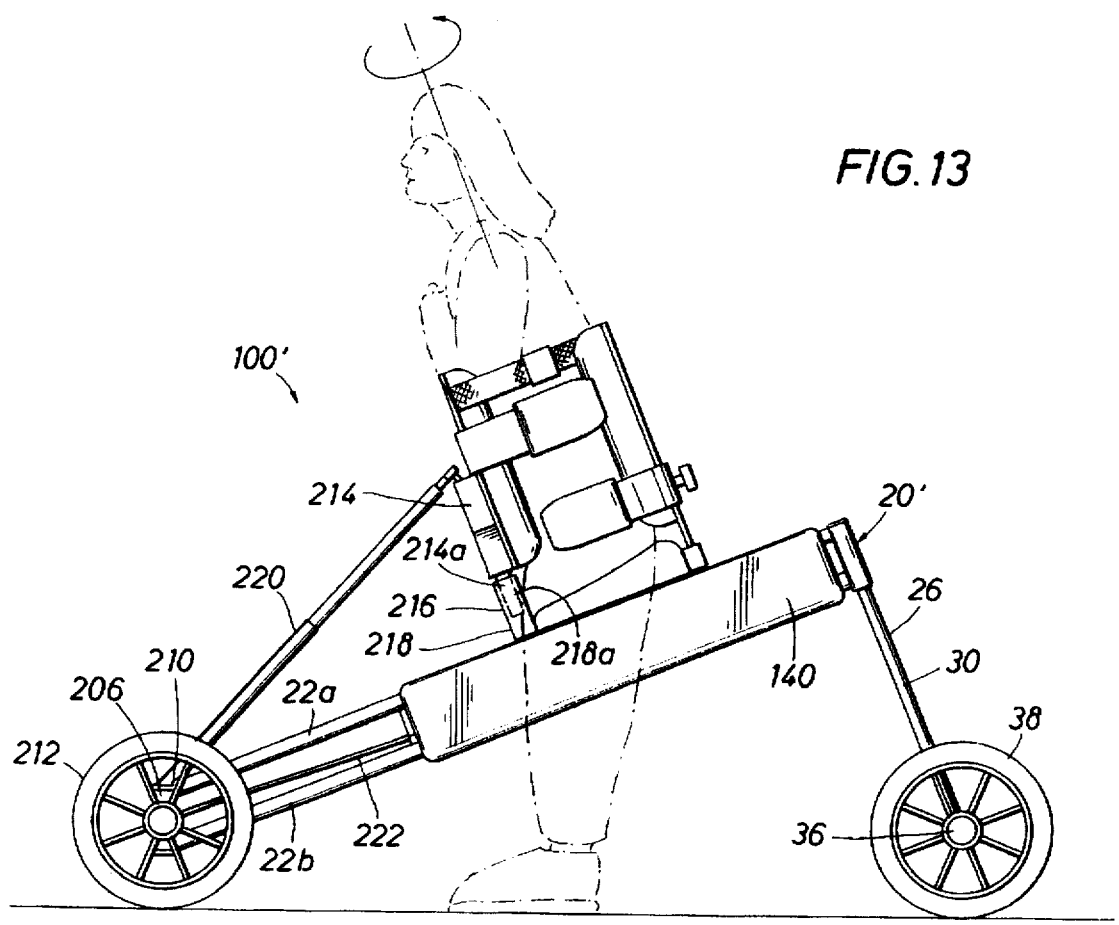
FIG. 13 is a side elevational view of a second embodiment of the user-propelled walking apparatus.
Figure 14:
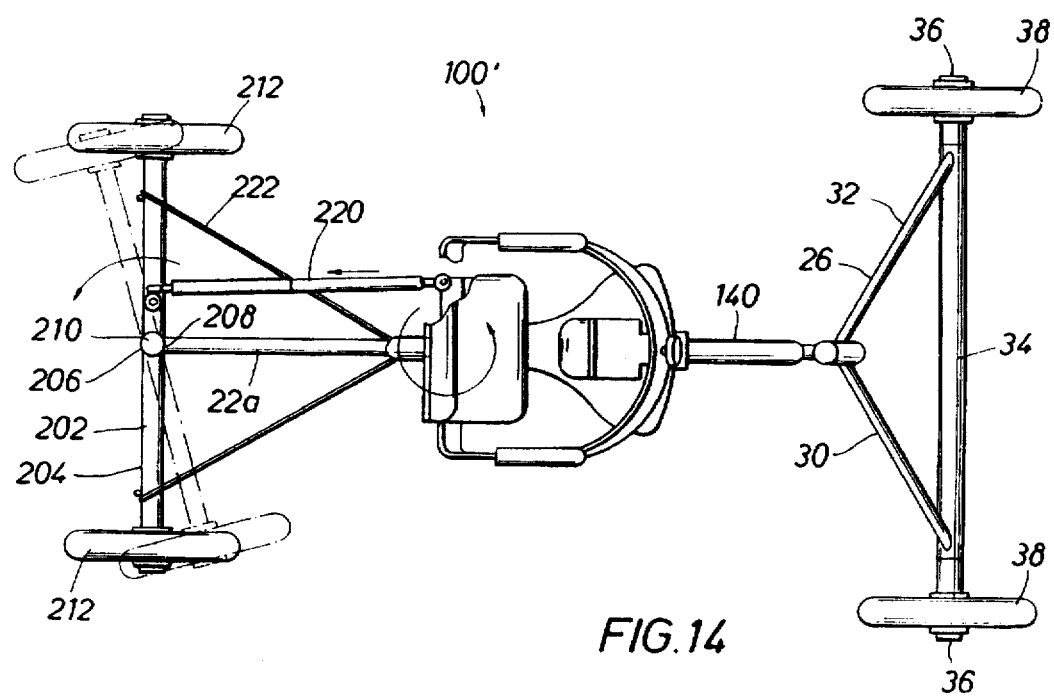
FIG. 14 is a top view of the second embodiment of the user-propelled walking apparatus.

The second embodiment of the user-propelled walking apparatus 100' is shown in FIGS. 13 and 14. This embodiment is very similar to the first embodiment described above. The same reference numbers are used to identify like parts. Reference should be made to the above description for like reference numbers and the following discussion will be primarily directed to the different features of the second embodiment.

Referring to FIGS. 13 and 14, a front frame 202 includes a horizontal front member 204 having a center vertical crossmember 206. The vertical crossmember 206 is pivotally connected with a pivot pin 210 to an upright post 208 which is connected to the pair of longitudinal frame members 22. The front member 204 thus pivots about the center vertical crossmember 206 as shown in FIG. 14. The front wheels 212 are mounted similarly to the front member 204 as the rear wheels 38 are to the back member 34.

A movable torso support unit 214 is mounted with a mounting post assembly 216. Referring to FIG. 13, the mounting post assembly 216 includes a lower mounting post 218 which is secured to the front seat support member (not shown). As shown in FIG. 13, an upper portion of the lower mounting post 218 includes a bore 218a for rotatably receiving an extension 214a of the movable torso support unit 214. In the user-propelled walking apparatus 100' of the second embodiment, the extension 214a and the movable torso support unit 214 are allowed to rotate relative to the lower mounting post 218. The movable torso support unit 214 is maintained in a substantially upright position. The movable torso support unit 214 is generally triangular-shaped as described above. The movable torso support unit 214 is permitted to rotate about a substantially vertical axis through an angle of approximately 30° to either the left or the right.

In the second embodiment, the steering of the user-propelled walking apparatus 100' is controlled by the rotation of the movable torso support unit 214 about the longitudinal axis of the extension 214a. The mechanical transmission for controlling steering required to change the direction of the front wheels 212 by the rotational movement of the movable torso support unit 214 may be accomplished in a variety of ways. Referring to FIGS. 13 and 14, a single adjustable-length link 220 is attached at one end to the movable torso support unit 214 and at the other end to the front member 204 through rod end bearings (spherical bearings) at both ends. Preferably, the attachment point of the link 220 on the movable torso support unit 214 is located near the left or right edge of the movable torso support unit 214 with the attachment point to the front member 214 on the corresponding side. In this manner, the child can control the direction of the user-propelled walking apparatus 100' by twisting his/her torso. The front support assembly rotates with the child's torso as the child turns it in either direction, while still supporting the child's slightly prone upper body against gravity. The alternative mechanism of steering found in the user-propelled walking apparatus 100' allows children who are better at twisting than leaning left and right a chance to steer the device.

Referring to FIGS. 13 and 14, it may be desirable to include a resilient stretch cord 222 having first and second ends attached to the front member 204 and medially attached to the longitudinal frame members 22 to provide elastic resistance to rotational forces exerted by the child. This reduces the tendency of the child's uncontrolled movements to steer the user-propelled walking apparatus 100 off the desired path. The stretch cord 222 also tends to return the user's torso to an upright posture and the user-propelled walking apparatus to a straight direction once a purposeful turn is complete.

It is to be understood that the gait guide system 142 as described for the first embodiment is also applicable to the second embodiment. It is also to be understood that the gait guide system is optional and may not be needed for certain children.

It is additionally to be understood that the steering tie rod assembly 48 of the first embodiment can also be used in the second embodiment by incorporating one of various mechanical transmission for controlling steerings between the tie rod assembly 48 and the rotatable torso support unit 214. For example, the mechanical transmission for controlling steering could include a push rod and bellcrank-type assembly to translate rotational movement of the torso support unit 214 to the steering tie rod assembly.

The foregoing disclosure and description of the invention are illustrative and explanatory thereof, and various changes in the size, shape and materials, as well as in the details of the illustrated construction may be made without departing from the spirit of the invention.

What is claimed is:

1. A steerable walking apparatus propelled by a user's legs, comprising:
    a frame assembly having a pair of steerable front wheels and a pair of rear wheels, wherein said frame assembly comprises:
        a front frame;
        a rear frame; and
        a central longitudinal frame member connecting said front frame to said rear frame;
    a support system mounted to said central longitudinal frame member, said support system including a seat assembly and a front torso support assembly, said front torso support assembly positioned in front of said seat assembly; and
    a steering control assembly connected to said support system to control the direction of said pair of steerable front wheels.

2. The apparatus of claim 1, wherein said front torso support assembly is pivotally mounted in a substantially vertical plane and said steering control assembly is connected to said front torso support assembly.

3. The apparatus of claim 1, further comprising a gait guide system to limit the movement of a user's feet.

4. The apparatus of claim 1, wherein said support system is adjustable in height and adjustable in the angle of inclination.

5. The apparatus of claim 2, wherein said support system further comprises:
    a mounting post assembly securely connected to said frame assembly; and
    said front torso support assembly is pivotally mounted to said mounting post assembly.

6. The apparatus of claim 1, wherein said support system provides support to the user with the user in a generally upright, standing position.

7. The apparatus of claim 1, wherein said front torso support assembly is slightly prone to allow purposeful extension of the user's legs to be directed rearward to produce forward propulsion.

8. A steerable walking apparatus propelled by a user's legs, comprising:
    a frame assembly having a pair of steerable front wheels and a pair of rear wheels:
    a support system mounted to said frame assembly, said support system including a seat assembly and a front torso support assembly, said front torso support assembly positioned in front of said seat assembly:
    a steering control assembly connected to said support system to control the direction of said pair of steerable front wheels; and
    a gait guide system to limit the movement of the user's feet, said gait guide system comprising:
        a pair of independent gait guides attached to said frame assembly, each of said gait guides comprising:
            an elongate rail pivotally connected to said frame assembly;
            a sleeve slidably mounted on said elongate rail; and
            a shoe bracket pivotally connected to said sleeve.

9. The apparatus of claim 8, wherein said elongate rails pivot about a horizontal axis.

10. The apparatus of claim 9, wherein said frame assembly includes a longitudinal frame member and each said elongate rail moves in a plane substantially parallel to said longitudinal frame member.

11. The apparatus of claim 8, further comprising:
    a shoe attached to each said shoe bracket, said shoe having a sole; and
    a roller assembly connected to each said sole.

12. The apparatus of claim 11, wherein each said roller assembly comprises a plurality of rotatably-mounted rollers having a longitudinal axis substantially parallel with said elongate rails.

13. A steerable walking apparatus propelled by the user's legs, comprising:
    a frame assembly having a pair of front wheels and a pair of rear wheels, wherein said frame assembly comprises:
        a front frame;
        a rear frame; and
        a central longitudinal frame member connecting said front frame to said rear frame;
    a seat and a movable upper body support assembly mounted to said central longitudinal frame member;
    said seat assembly and said movable upper body support assembly permitting the user's legs to be substantially vertically extended with the user's feet contacting the ground;

and a steering control assembly connected to said upper body support assembly to control direction of said pair of front wheels.

14. The apparatus of claim 13, wherein said upper body support assembly supports the user's body in a generally upright, standing position.

15. The apparatus of claim 13, wherein said movable upper body support assembly is allowed to pivot about a substantially horizontal axis and in a substantially vertical plane.

16. The apparatus of claim 13, wherein said upper body assembly and said seat assembly are each adjustable in height and in the angle of fore-aft inclination.

17. The apparatus of claim 14, further comprising:

a mounting post assembly securely connected to said frame assembly; and said movable upper body support assembly is pivotally mounted to said mounting post assembly.

18. The apparatus of claim 13, wherein said movable upper body support assembly is slightly prone to allow purposeful extension of the user's legs to be directed rearward to produce forward propulsion.

19. A steerable walking apparatus propelled by a user's legs, comprising:

a frame assembly having a pair of steerable front wheels and a pair of rear wheels;

a support system mounted to said frame assembly, said support system including a seat assembly and a front torso support assembly, said front torso support assembly positioned in front of said seat assembly, wherein said front torso support assembly is pivotally mounted to said frame assembly in a substantially vertical plane; and a steering control assembly connected to said front torso support assembly to control the direction of said pair of steerable front wheels, wherein said frame assembly has a longitudinal axis from said pair of steerable from wheels to said pair of rear wheels and said from torso support assembly pivots laterally about an axis substantially parallel to the longitudinal axis of said frame assembly.

20. The apparatus of claim 19, wherein said support system is adjustable in height and adjustable in the angle of inclination.

21. The apparatus of claim 19, wherein said support system provides support to the user with the user in a generally upright, standing position.

22. The apparatus of claim 19, wherein said front torso support assembly is slightly prone to allow purposeful extension of the user's legs to be directed rearward to produce forward propulsion.

* * * * *